US008538929B2

(12) United States Patent
Constantinescu et al.

(10) Patent No.: US 8,538,929 B2
(45) Date of Patent: Sep. 17, 2013

(54) ARCHIVING DE-DUPLICATED DATA ON TAPE STORAGE MEDIA USING GRAPH PARTITIONS

(75) Inventors: Corneliu Mihail Constantinescu, San Jose, CA (US); Michael Anthony Richmond, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/178,487

(22) Filed: Jul. 7, 2011

(65) Prior Publication Data

US 2013/0013567 A1 Jan. 10, 2013

(51) Int. Cl.
*G06F 7/00* (2006.01)
*G06F 17/30* (2006.01)

(52) U.S. Cl.
USPC ............................. 707/665; 707/798; 707/968

(58) Field of Classification Search
USPC ................. 707/665, 667, 692, 693, 795, 798, 707/968
See application file for complete search history.

(56) References Cited

U.S. PATENT DOCUMENTS

| | | | | |
|---|---|---|---|---|
| 6,154,220 A * | 11/2000 | Prakriya et al. | | 345/440 |
| 7,818,272 B1 * | 10/2010 | Mishra et al. | | 706/14 |
| 2006/0038811 A1 * | 2/2006 | Owens et al. | | 345/418 |
| 2007/0168336 A1 * | 7/2007 | Ransil et al. | | 707/3 |
| 2008/0123957 A1 * | 5/2008 | Ratner et al. | | 382/173 |
| 2009/0157715 A1 * | 6/2009 | Murthy | | 707/101 |
| 2009/0177855 A1 | 7/2009 | Drews et al. | | |
| 2009/0228655 A1 * | 9/2009 | Yamane | | 711/117 |
| 2010/0250501 A1 * | 9/2010 | Mandagere et al. | | 707/692 |
| 2011/0004601 A1 * | 1/2011 | Peckham et al. | | 707/752 |

OTHER PUBLICATIONS

Yan et al. Mining Closed Relational Graphs with Connectivity Constraints. In Proceedings of the eleventh ACM SIGKDD international conference on Knowledge discovery in data mining (KDD '05). ACM, New York, NY, USA, pp. 324-333.*

* cited by examiner

*Primary Examiner* — James E Richardson
(74) *Attorney, Agent, or Firm* — Kenneth L. Sherman, Esq.; Michael Zarrabian, Esq.; Sherman & Zarrabian LLP (57) ABSTRACT

Embodiments of the invention relate to data archiving on storage medium such as magnetic tapes based on graph partitioning. One aspect of the invention concerns a method that comprises representing a file system as a graph where each node of the graph represents a file and each edge represents file chunks common to the files corresponding to the nodes connected by the edge. The graph is repeatedly partitioned into disjoint sub-graphs. If the files and duplicate file chunks associated with a sub-graph fit into a data storage medium, then the files and duplicate file chunks are stored in the medium. Otherwise, the method may partition the sub-graph into smaller disjoint sub-graphs taking into consideration of degrees of connectivity of the nodes.

20 Claims, 10 Drawing Sheets

ARCHIVING DE-DUPLICATED DATA ON TAPE STORAGE MEDIA USING GRAPH PARTITIONS

BACKGROUND

Embodiments of the invention relate generally to archiving data on data storage media, and more particularly, to maximizing the capacity of archival data tapes using graph representation of the data.

Data are typically stored in magnetic storage tapes sequentially, i.e., one file after another. If the files to be stored are in a de-duplicated format, where duplicate portions of the files have been removed, then the de-duplicated files may need to be restored to their original duplicated format before they are written to tapes. Storing the duplicate file portions requires additional space in the data storage tapes and takes more processing time.

BRIEF SUMMARY

Exemplary embodiments of the invention relate to archiving de-duplicated data on storage media, using graph representation to maximize the capacity of the storage media and to store de-duplicated data without the need to restore the data to their original duplicated format. The exemplary embodiments of the invention may be used for archiving data on tape library systems and storing file systems in mass storage disk systems, among other applications.

One aspect of the invention concerns a method that comprises representing a file system as a graph, wherein each node in the graph represents a file and each edge in the graph represents file chunks common to the files associated with the nodes connected by the edge, and partitioning the graph into disjoint sub-graphs. If the files and common file chunks respectively represented by the nodes and edges in a sub-graph fit into a data storage medium, the method stores the files and common file chunks in the medium. Otherwise, the method may repeatedly partition a sub-graph into smaller sub-graphs wherein adjacent nodes in a sub-graph that have generally high degrees of connectivity are grouped into the same sub-graph. The method may further store the files and common file chunks respectively represented by the nodes and edges of a smaller sub-graph in another data storage medium.

Another aspect of the invention concerns a computer program product for archiving data. The computer program product comprises a computer readable storage medium having computer readable program code embodied therewith. The computer program product may comprise computer readable program code configured to represent a file system as a graph, wherein each node in the graph represents a file and each edge in the graph represents file chunks common to the files associated with the nodes connected by said edge, and partition the graph into disjoint sub-graphs.

In the case where the files and common file chunks associated with the nodes and edges in a sub-graph fit into a data storage medium, the computer program product may comprise computer readable program code configured to store the files and duplicate file chunks in the medium. Otherwise, the computer program product may comprise computer readable program code configured to repeatedly partition the sub-graph into smaller disjoint sub-graphs, wherein adjacent nodes in the sub-graph that have generally high degrees of connectivity are grouped into the same sub-graph.

The computer program product may further comprise computer readable program code configured to store the files and common file chunks respectively represented by the nodes and edges of a smaller sub-graph in a second data storage medium.

Another aspect of the invention concerns a system comprising a data representation component for representing a file system as a graph, wherein each node in the graph represents a file and each edge in the graph represents file chunks common to the files associated with the nodes connected by the edge, and a graph partitioning component for partitioning the graph into disjoint sub-graphs. If the files and common file chunks respectively represented by the nodes and edges in a sub-graph fit into a data storage medium, a data storing component in the system may store the files and common file chunks in the medium.

In the case where the files and common file chunks associated with a sub-graph do not fit into a data storage medium, the graph partitioning component may repeatedly partition the sub-graph into smaller disjoint sub-graphs, wherein adjacent nodes in a sub-graph that have generally high degrees of connectivity are grouped into the same sub-graph. The system may comprise a data storing component for storing the files and common file chunks respectively represented by the nodes and edges of a smaller sub-graph in a second data storage medium.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION

The invention relates to methods, computer program products, and systems for archiving data on a data storage medium, using graph representation and partitioning to maximize the capacity of the storage medium and to allow quick storing of the de-duplicated data without the need to restoring the de-duplicated data to its original duplicate form. In addition, the disclosed methods, computer program products, and systems take into consideration possible uneven loads on the tapes dues to files of various sizes when partitioning the files for archiving on individual tapes. The invention is described in exemplary embodiments with reference to the Figures, in which like numbers represent the same or similar elements. It will be appreciated by those skilled in the art that variations may be accomplished in view of these teachings without deviating from the spirit or scope of the invention.

Figure 1:
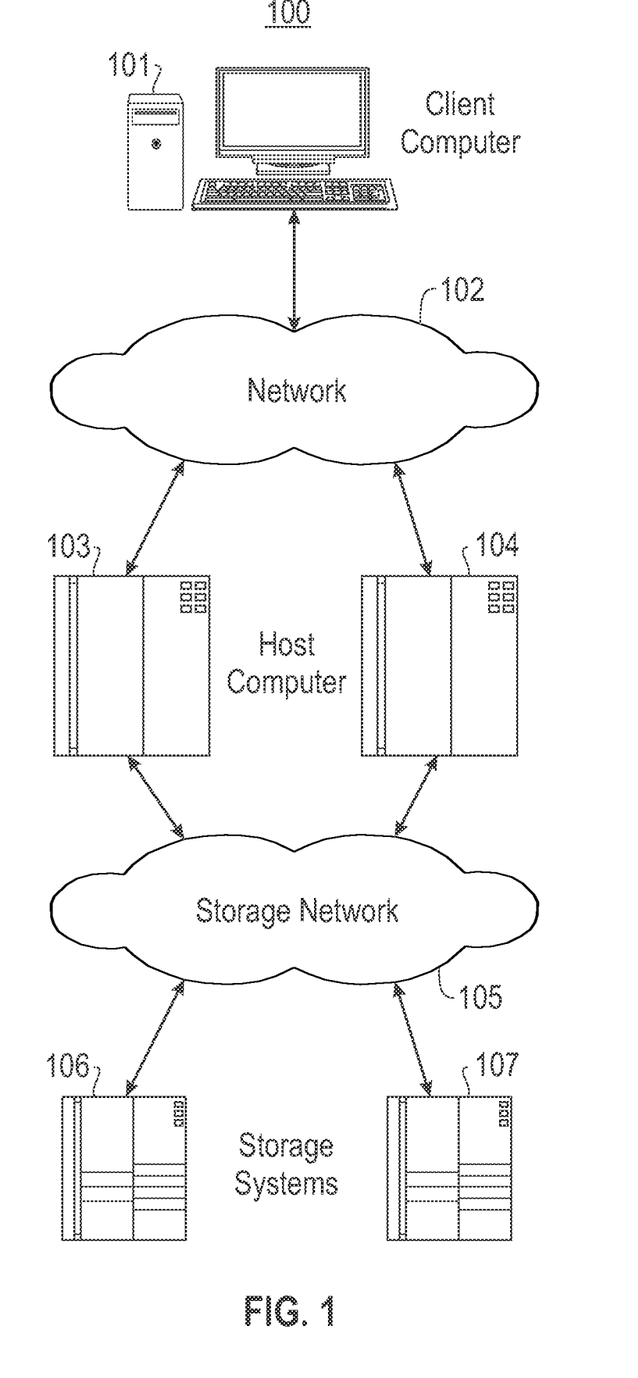
FIG. 1 illustrates an example computing configuration in which methods and systems for archiving data may be provided, according to embodiments of the invention.

Referring now to the drawings and in particular to FIG. 1, there is illustrated an example computing configuration in which methods and systems for archiving data may be provided according to exemplary embodiments of the invention. The data archiving methods and systems disclosed herein may be applicable to a wide variety of different computers, servers, storage systems, and networks in addition to the illustrated configuration. The computing configuration 100 may comprise one or more client computer 101 through which a user may archive data to a storage medium such as a magnetic data tape, magnetic disk, or optical disc. The client computer 101 communicates with one or more host computers 103-104 through computer network 102. The computer network 102 may comprise one or more wide area networks (WANs), local area network (LANs), private intranets and the Internet.

Host computers 103-104 may include CPUs (Central Processing Units) and memory for executing various programs, thereby providing a variety of computing functions to client computer 101. For example, a host computer 103-104 may be a server that hosts applications for providing web services and database services to client computer 101.

The computing configuration 100 may include one or more storage systems 106-107 for storing data. Multiple storage systems 106-107 may be interconnected through a network 105 such as a storage area network (SAN), a LAN (Local Area Network), a Fibre Channel interface or other host interface protocols. Each data storage system 106-107 may comprise hard disk drives, solid state drives, arrays of hard disk drives or solid-state drives, tape drives, tape libraries, CD-ROM libraries, or the like. Further, each data storage system 106-107 may comprise multiple levels such as a primary level of solid state storage, a secondary level of disk storage, and a third level of tape libraries.

Storage systems 106-107 may comprise one or more storage controllers, disk arrays and tape libraries. For example, the storage systems 106-107 may comprise IBM TotalStorage™ systems D58000®. The D58000® systems are high-performance, high-capacity storage controllers providing disk storage that is designed to support continuous operations. The storage controllers may include host adapters for interfacing with host computer 104 and device adapters for interfacing with attached storage devices such as disks and solid state drives. The host adapters may support various host-device interface protocols such as Fibre Channel (FC), Fibre Channel Arbitration Loop (FC-AL), Internet Small Computer System Interface (iSCSI), etc.

Users and computer programs may store data on storage system 105 and retrieve data from them, using various data processing applications and storage management software running in the host 103-104 and the storage systems 106-107. The storage management software may provide, among other functions, utilities for managing data in the storage systems 106-107 such as data archiving, backup, restore, copy, recovery, and migration. In another embodiment, storage systems 106-107 may be IBM System Storage™ TS7650 ProtecTIER® Deduplication Appliances. In yet another embodiment, storage systems 106-107 may be IBM System Storage™ TS3500® tape library systems.

Figure 2:
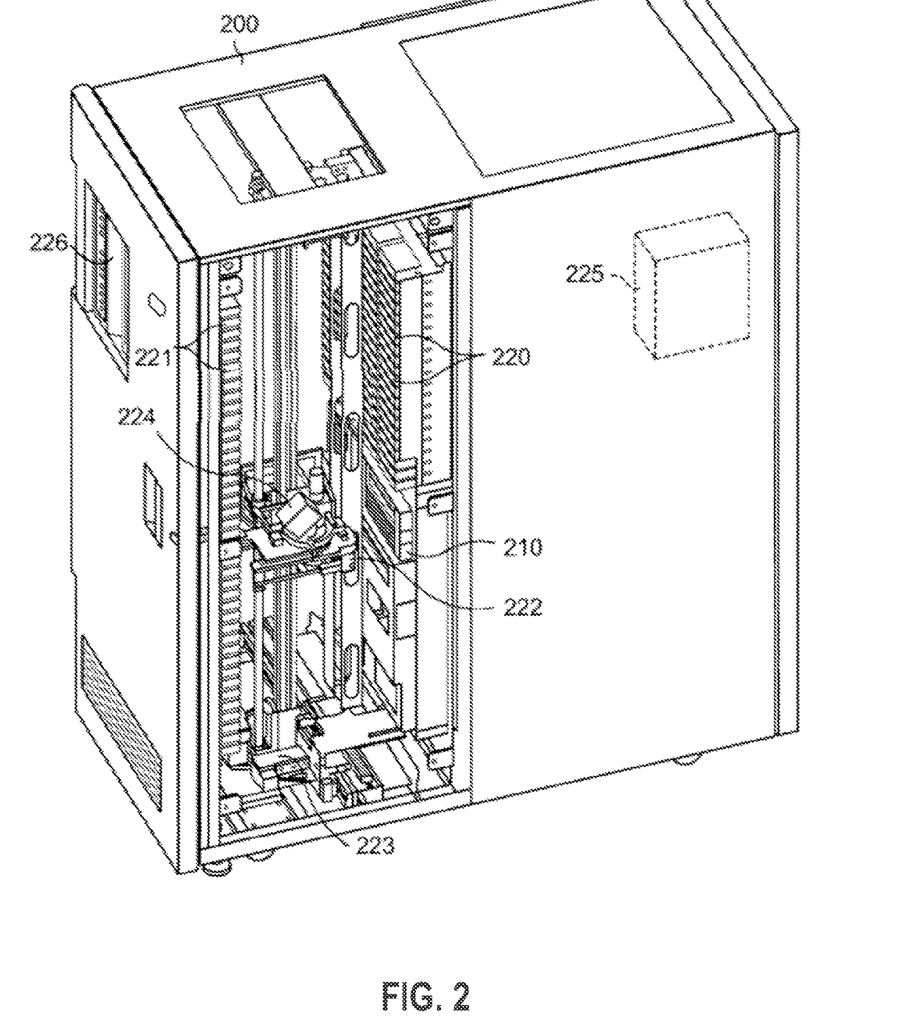
FIG. 2 illustrates a mechanical view of a data storage tape library that may be used for archiving data, according to an embodiment of the invention.

FIG. 2 illustrates a data storage tape library 200 that may be used for archiving data, in accordance with an embodiment of the invention. The data storage tape library 200 is an automated tape library that may include a number of tape drives 210 for reading and writing data on magnetic tape media, such as single-reel or two-reel magnetic tape cartridges. Examples of the library 200 include IBM TS3400™ and TS3500™ Tape Libraries, IBM TotalStorage™ 3494 Tape Libraries, and IBM 3952™ Tape Frames Model C20, which store magnetic tape cartridges and use IBM TS1130™ tape drives. Other examples of the library 200 include IBM TS3310™ and TS3100/3200™ tape libraries which store magnetic tape cartridges and use IBM LTO (Linear Tape Open) tape drives.

A plurality of tape cartridges 220 are stored in banks or groups of cartridge storage slots 221. Cartridges 220 may comprise a variety of tape media, such as magnetic tape cartridges, magnetic tape cassettes, and optical tape cartridges, in various formats. An access robot 223, including a cartridge picker 222 and a bar code reader 224 mounted on the cartridge picker 222, transports a selected cartridge 220 between a cartridge storage slot 221 and a drive 210. Bar code reader 224 is mounted directly on picker 222 so that the library 200 can check the bar code on cartridge 220 before picking the cartridge and transporting it to a drive 210, storage slot 221, or import/export mail slot 226.

The automated tape library 200 further has a library controller 225 which includes at least one microprocessor. The library controller 225 may serve to provide an inventory of the cartridges 220 and to control the library 200. The library controller 225 controls the actions of the access robot 223, cartridge picker 222, and bar code reader 224.

Figure 3:
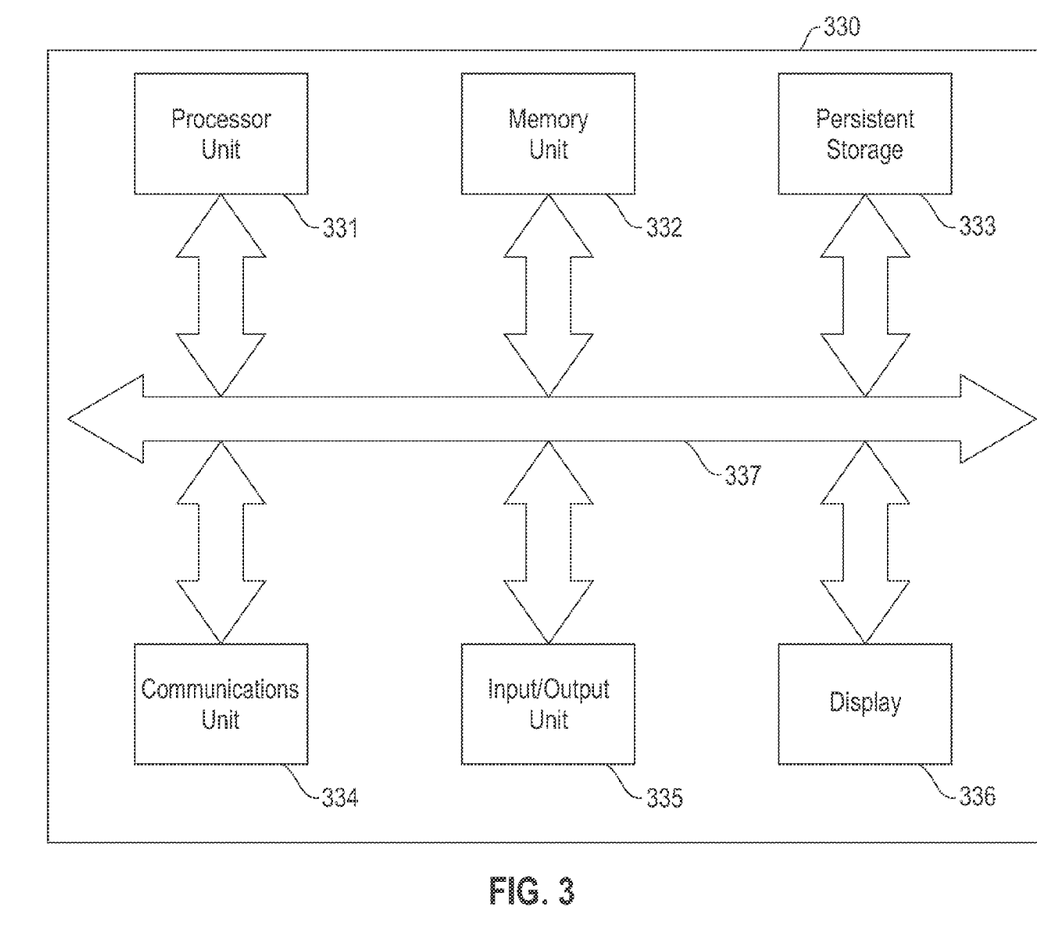
FIG. 3 illustrates an exemplary block diagram of a representative computer for providing data archiving functions, according to an embodiment of the invention.

FIG. 3 illustrates an exemplary block diagram of a representative computer which may be incorporated in a client computer 101, host computer 103, or tape library system 105. Computer system 300 may include a processor unit 331, a memory unit 332, a persistent storage 333, a communications unit 334, an input/output unit 335, a display 336 and a system bus 337. Computer programs are typically stored in persistent storage 333 until they are needed for execution by an operating system, at which time the programs are brought into the memory unit 332 so that they can be directly accessed by the processor unit 331. The processor unit 331 selects a part of memory unit 332 to read and/or write by using an address that the processor 331 gives to memory 332 along with a request to read and/or write. Usually, the reading and interpretation of an encoded instruction at an address causes the processor 331 to fetch a subsequent instruction, either at a subsequent address or some other address. The processor unit 331, memory unit 332, persistent storage 333, communications unit 334, input/output unit 335, and display 336 interface with each other through the system bus 337.

Figure 4:
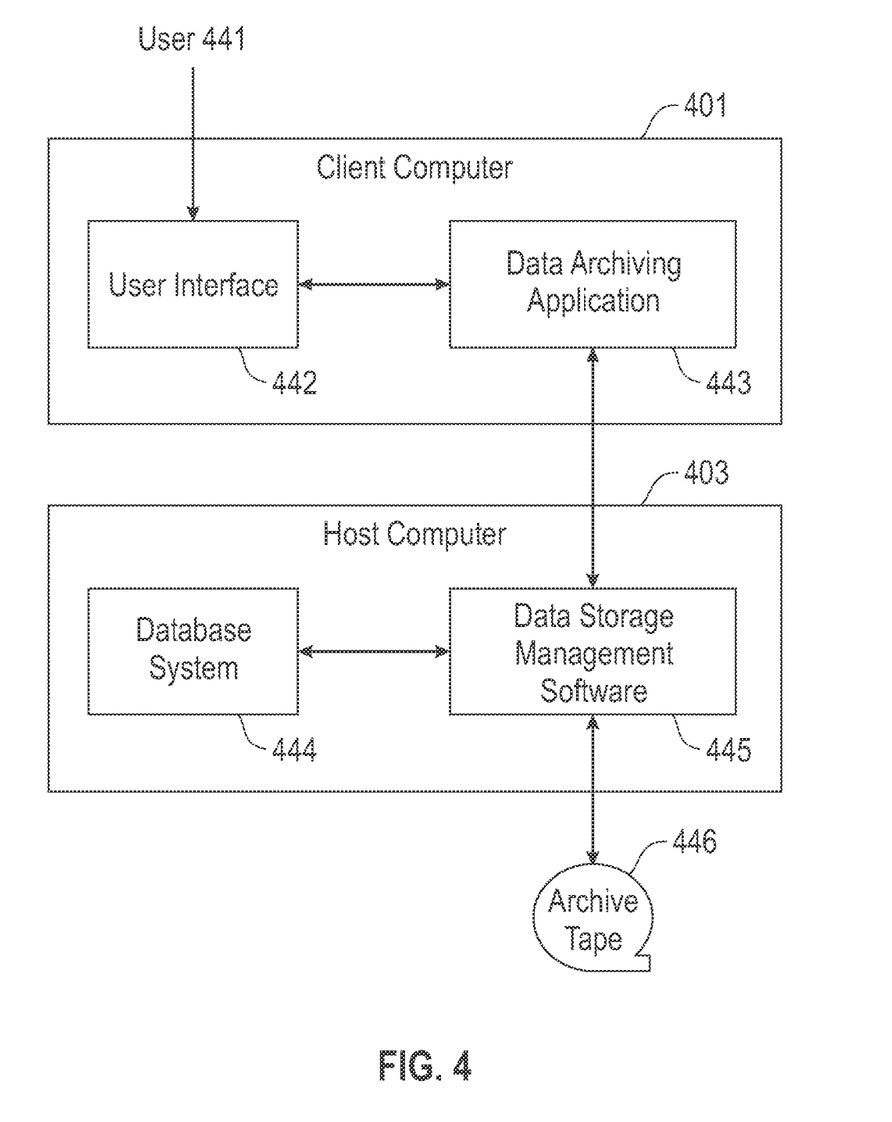
FIG. 4 illustrates an exemplary block diagram of programs operating in a computer system to provide data archiving functions, according to an embodiment of the invention.

FIG. 4 illustrates an exemplary block diagram of programs operating in a client computer 401 and host computer 403 to provide data archiving functions, in accordance with an embodiment of the invention. The various programs operating on client computer 401 and host computer 403 are typically controlled by their respective operating systems. A user 441 may interact with a data archiving application 443 running on the client computer 401 through a user interface 442. The data archiving application 443 processes data to be archived on storage medium such as magnetic tapes, in accordance with the disclosed embodiments of the invention. The data to be archived may come from a database 444 which the data archiving application 443 may retrieve through data storage management software 445. An exemplary embodiment of the data archiving application 443 is described in detail with reference to FIGS. 5 and 6A-6D.

Once the data archiving application 443 has processed the data to be archived, the data archiving application 443 may interact with the data storage management software 445 to store the data on magnetic data storage tapes 446.

Figure 5:
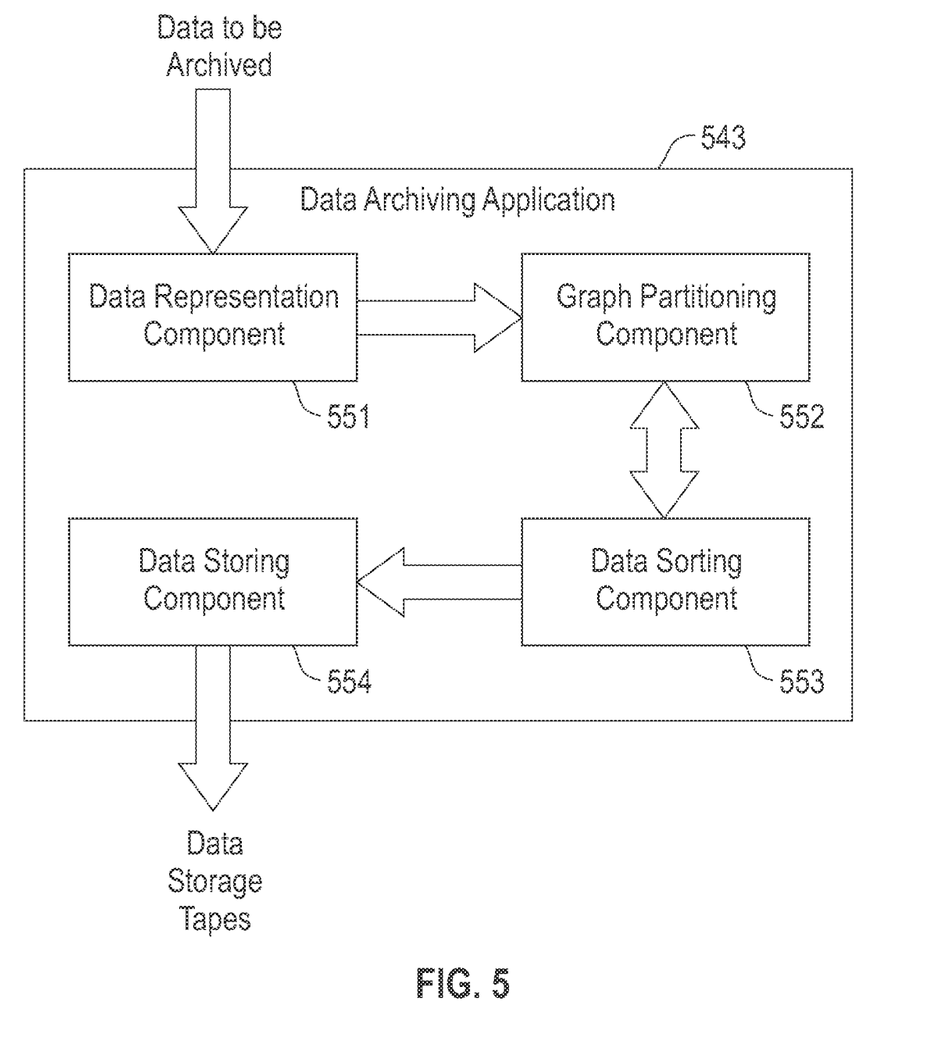
FIG. 5 illustrates an exemplary block diagram of a data archiving system, according to an embodiment of the invention.

FIG. 5 illustrates an exemplary block diagram of a data archiving application, according to an embodiment of the invention. Data archiving application 543 may be coupled to a user interface 442 through which a user 441 can select files or file systems in a database 444 for archiving on storage tapes 446. The data archiving application 543 may interact with database 444 and data storage management software 445 that run on host computer 403, as described with reference to FIG. 4.

The data archiving application 543 may comprise a data representation component 551 for modeling a file system or a data structure to be archived as a graph. The file system may be a de-duplicated file system. In a de-duplicated file system, the file chunks commonly shared by two or more files were removed from the files and only one copy of the shared file chunks was maintained in the file system. The graph that represents the file system is generally an undirected graph where each node in the graph corresponds to a file in the file system. Each edge of the graph corresponds to the file chunks shared by the two files associated with the two nodes connected by this edge. The file associated with each node in the graph thus contains only unique file chunks (modulo file), so the overall size of the file is less than or equal to the original file size.

Common file chunks may be directly or indirectly shared by the files in a file system. In a direct sharing, two files A and B may include a common file chunk (i) and this common file chunk (i) is indicated in the weight of the edge connecting the two nodes associated with theses files. In an indirect sharing, files A and B each shares a common file chunk (j) with file C. The common file chunk (j) is indicated in the weight of the edge connecting the nodes associated with files A and C, and the weight of the edge connecting the nodes associated with files B and C. The common file chunk (j) is not reflected in the edge weight between the nodes associated with files A and B, and is not stored in the data storage medium when the data are archived.

Singleton files (files that do not share any chunks with other files) and identical files (replicas of the same file) are not represented in the graph. As described with reference to FIG. 5, singleton files can be placed on any tape to balance tape loads, and replicas may be tracked through the file metadata. The removal of the singleton and replica files may significantly reduce the number of files to be modeled by the data representation component 551 in the graph. For example, on a sample file system with 8940 files, there are 432 files remaining after the singletons and replicas are removed.

In one embodiment, each edge in the graph may be associated with a value (or weight) that indicates the number of file chunks (or the size of data in the file chunks) shared by the files corresponding to the two connected nodes. Edge weights represent tape space savings if the shared file chunks associated with an edge are placed on the same tape as the files represented by the nodes connected by the edge. Accordingly, when the files associated with a set of connected nodes are stored on a tape, the overall size of data stored on the tape is equal to the sum of sizes of unique chunks in the files associated with the nodes but without the file chunks common to the nodes, i.e., the file chunks associated with the weight of an edge in a graph partition.

Figure 6A:
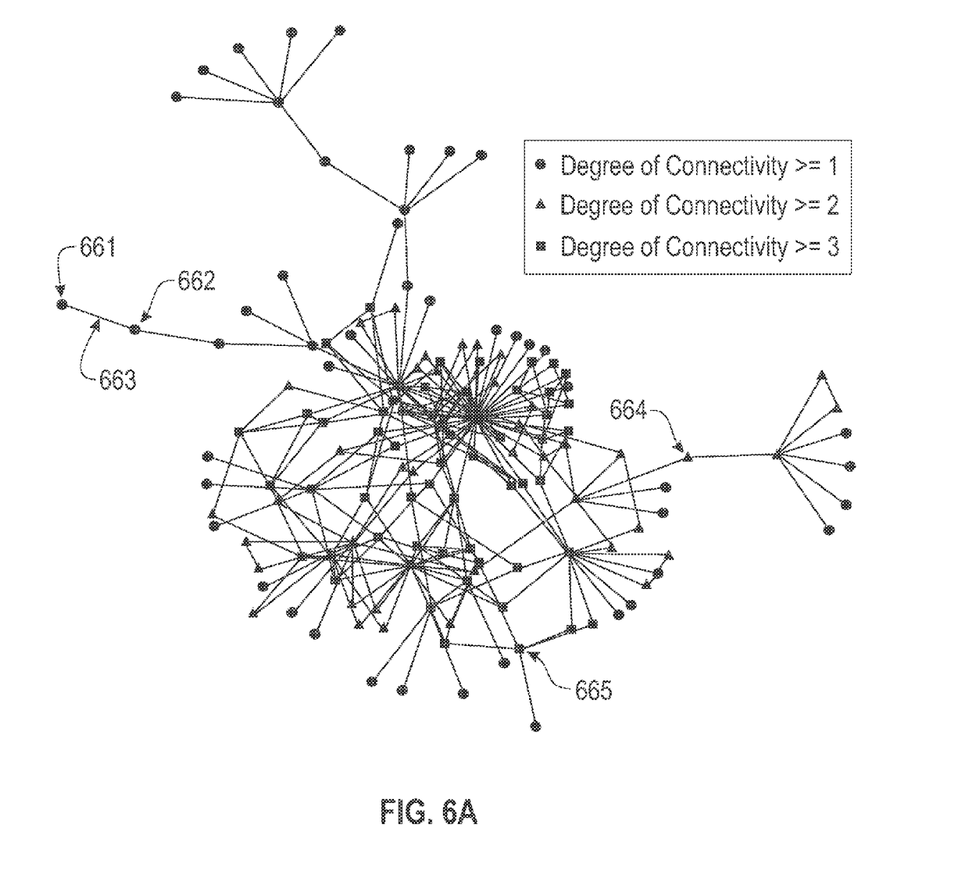
FIG. 6A illustrates an exemplary graph that represents a file system to be archived, as a result of the modeling by a data representation component in the archiving system, according to an embodiment of the invention.

FIG. 6A illustrates an exemplary graph that results from the modeling of a file system by the data representation component 551. The illustrated graph includes many nodes, such as nodes 661-662, where each node represents a file in the file system. Two adjacent nodes may be connected by an edge, such as edge 663 between nodes 661 and 662, which corresponds to the file chunks commonly shared by the files associated with nodes 661 and 662.

In one embodiment, the data representation component 551 may maintain a value that indicates the size of the file associated with a node and an edge weight that indicates the number of file chunks (or size of data) commonly shared by the files associated with the nodes connected by the edge. For example, node 661 is associated with a file of size 120 Kbytes and edge 663 indicates that there are 17 file chunks commonly shared between the files represented by nodes 661 and 662. In an alternate embodiment, the weight associated with an edge may indicate the total size of the file chunks shared by the two files associated with the two nodes connected by this edge.

As illustrated in FIG. 6A, some nodes in the graph 600 are connected to one adjacent node while other may be connected to two or more adjacent nodes. For example, node 661 is connected to a single node 662, while each of nodes 662 and 664 is connected to two adjacent nodes. The graph 600 further illustrates that node 665 is connected to five adjacent nodes. To further illustrate different degrees of connectivity of the nodes in graph 600, the nodes represented by the circles all have the degree of connectivity of at least 1. The nodes represented by the triangles have the degree of connectivity of at least 2, and those represented by the squares have the degree of connectivity of at least 3.

Figure 6B:
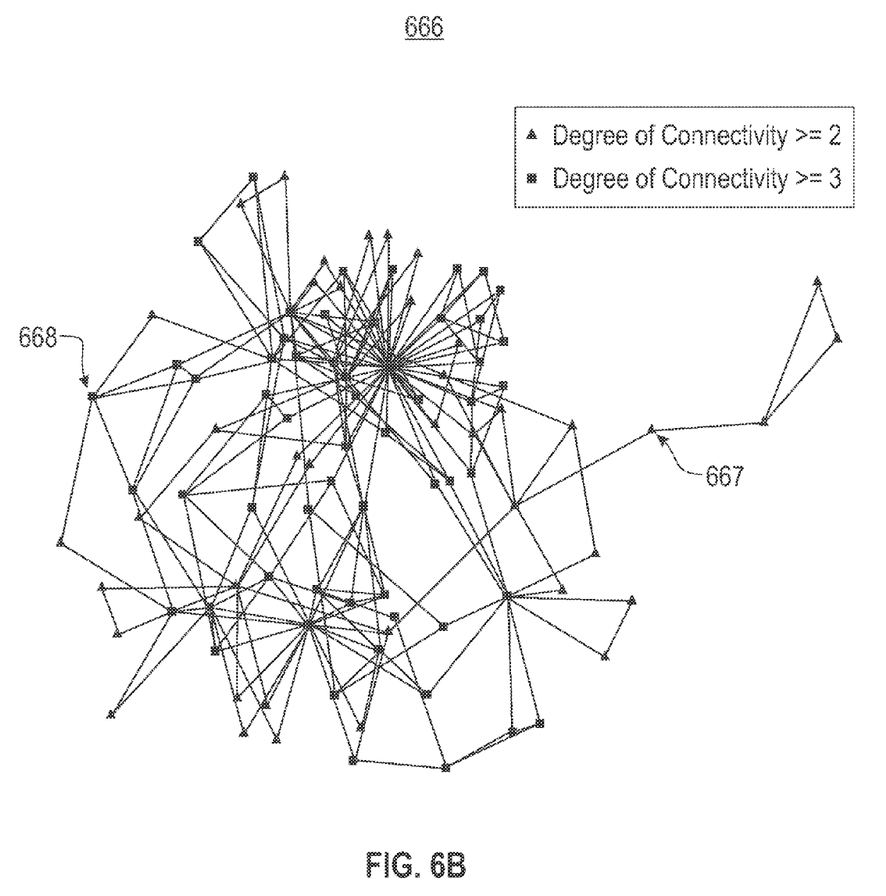
FIGS. 6B-6D illustrate exemplary partitions of the graph in FIG. 6A, as generated by a graph partitioning component based on the degree of connectivity of the nodes, according to an embodiment of the invention.

The graph generated by the data representation component 551 may include one or more clusters of densely connected nodes such as cluster 666 in FIG. 6B. Such clusters are candidates for storing in individual data storage media if their data fit on the media. Otherwise, the clusters may be partitioned into smaller sub-graphs by a graph partitioning component in the data archiving application 543.

Referring again to FIG. 5, the data archiving application 543 may include a graph partitioning component 552 for partitioning the graph 600 into disjoint sub-graphs of connected nodes to determine the best grouping of the files to be stored on individual archive tapes. The goal of the graph partitioning component 552 is to partition the graph 600 in order to minimize the number of files that share common file chunks to be stored on different tapes. This allows two files that have common file chunks to be later restored from one single tape that is loaded into a tape library, rather than having multiple tapes to be loaded to restore the files.

In one embodiment of the invention, the graph partitioning component 552 may partition the graph into sub-graphs based on a measure of connectivity among the nodes, which is referred to as the degree of connectivity. The degree of connectivity a node may be the number of edges originating from that node times the weights of these edges. Thus, the more adjacent nodes that a node is connected to, i.e., more edges originating from the node, a higher degree of connectivity this node is associated with.

Alternatively, the degree of connectivity of a node may be represented by the total size of the common file chunks associated with the weights of the edges originating from the node, i.e., the sum of the file chunks associated with all the edges originating from a node. In another embodiment, the degree of connectivity of a node may be represented by the total number of the common file chunks associated with the weights of the edges originating from the node.

As an example, assuming that all edges in a graph have edge weights of 1, then the degree of connectivity of a node would be the number of edges originating from that node. As a further example, the graph partitioning component 552 may use the degree of connectivity of 3 to initially partition the graph. As a result, adjacent nodes that have 3 or more edges originating from each node may be grouped into the same partition. Since a graph that represents a file system typically comprises clusters of densely connected nodes, such clusters would generally correspond to the resulting partitions when the degrees of connectivity of the nodes are considered in partitioning the graph.

Figure 6C:
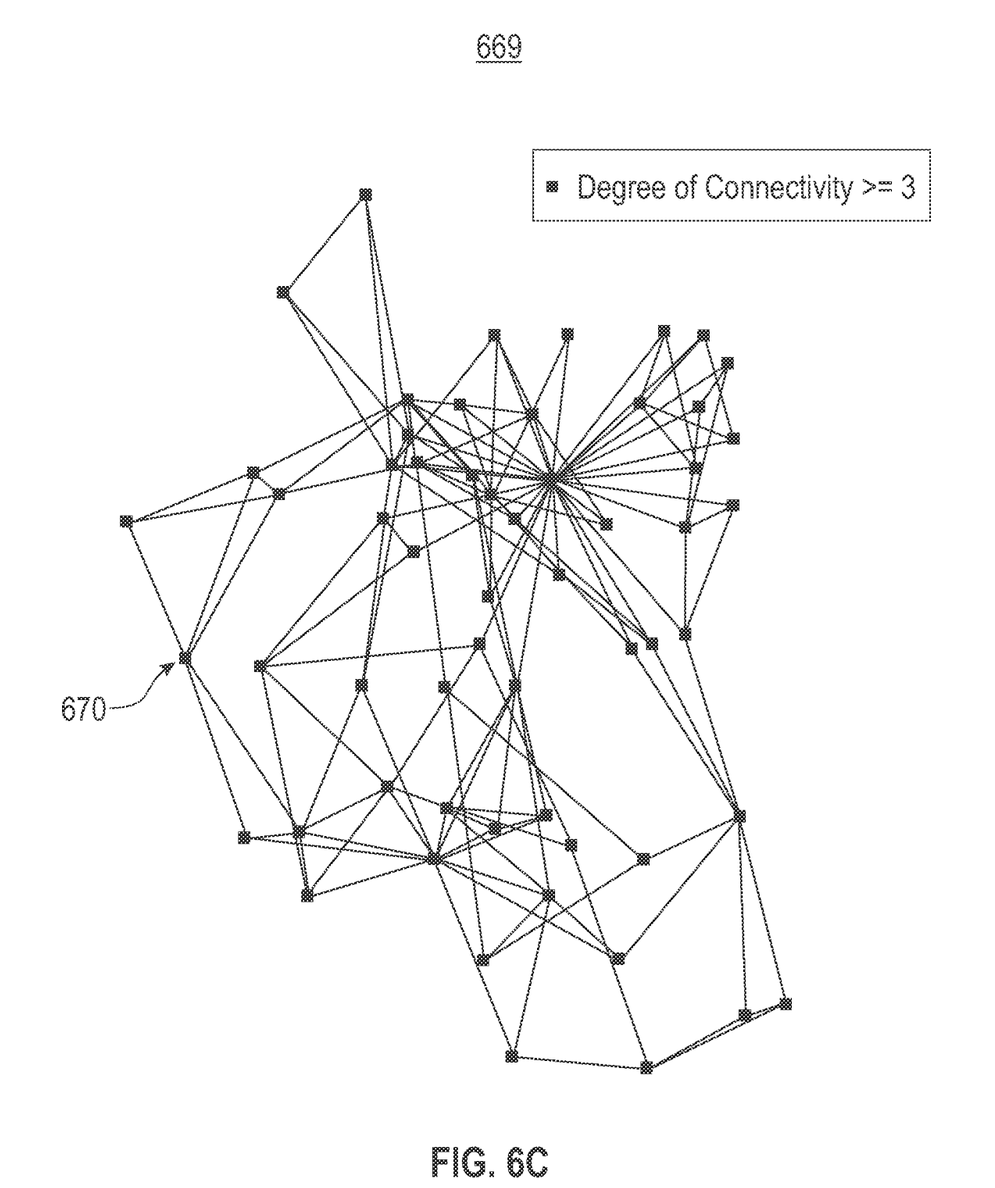
Figure 6D:
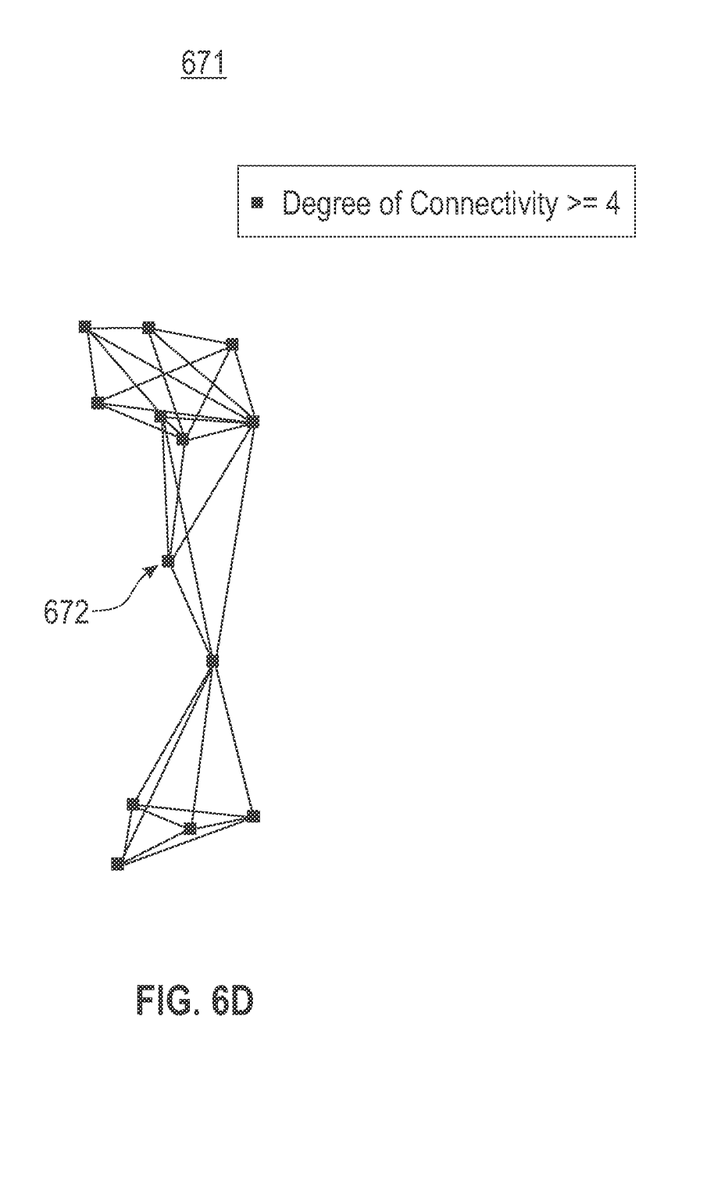

FIGS. 6B-6D illustrate exemplary partitions or sub-graphs 666-671 that the graph partitioning component 552 may generate from graph 600 based on the degree of connectivity of the nodes in the graph. FIG. 6B illustrates a graph partition 666 that the graph partitioning component 552 may generate from graph 600 to include all the nodes in the graph 600 having a degree of connectivity of 2 or more, i.e., each of the node in graph partition 666 is connected to two or more adjacent nodes. For example, node 667 is represented by a triangle and connected to 2 adjacent nodes, and node 668 is represented by a square and connected to three adjacent nodes.

Similarly, FIG. 6C illustrates a graph partition 669 that the graph partitioning component 552 may generate from the graph 600 to include all the nodes in the graph 600 having a degree of connectivity of 3 or more, i.e., each of the node in graph partition 669 is connected to three or more adjacent nodes. For example, node 670 is represented by a triangle and connected to 5 adjacent nodes. Lastly, FIG. 6D illustrates a graph partition 671 that includes only the nodes having a degree of connectivity of 4 or more, e.g., node 672 is connected to 4 adjacent nodes.

In order to efficiently group the nodes in a graph into graph partitions, the data archiving application 543 may include a data sorting component 553 for sorting the graph partitions in terms of the size of files corresponding to the nodes in each partition but without the shared file chunks associated with the edge weights in the partition. For example, the data sorting component 553 may sort the graph partitions in a decreasing order based on their size.

The data archiving application 543 may further comprise a data storing component 554 for sending the files associated with the nodes in each graph partition to the data storage management software 445 for storing on an individual data storage tape. The data storing component 554 may store the files associated with the graph partitions in the order sorted by the sorting component 553, for example, starting with the largest partition and ending with the smallest partition.

Figure 7:
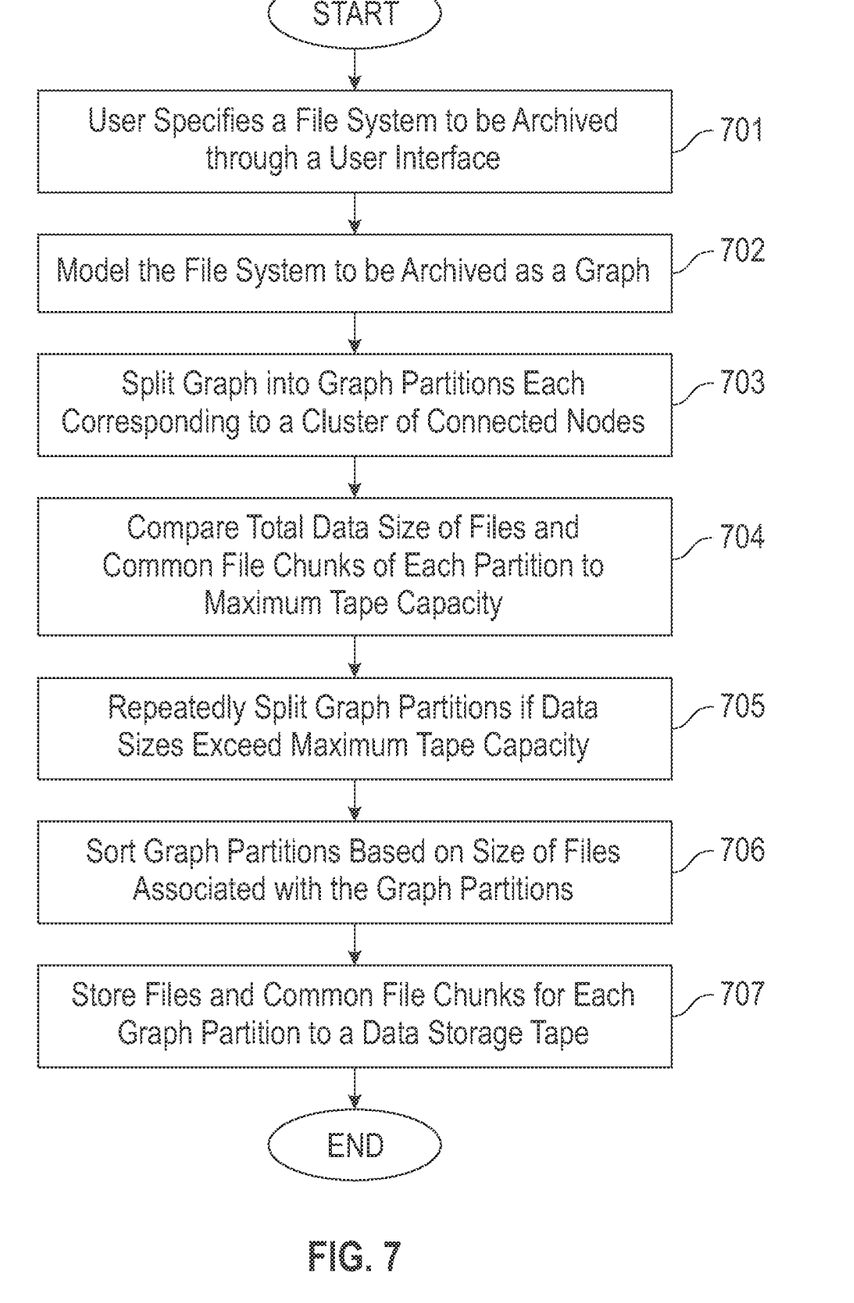
FIG. 7 is a flow chart of an exemplary process for archiving data, according to an embodiment of the invention.

FIG. 7 is a flow chart of an exemplary process for archiving data, according to an embodiment of the invention. The process begins at step 701 in which a user may specify, for example through a user interface 442, a file system or a data structure on database 444 to be archived. The data representation component 551 may model the file system or data structure to be archived as a graph at step 702, where each node of the graph represents a file in the file system or a subset of the data structure to be archived. Each edge in the graph corresponds to the file chunks that are commonly shared by the files associated with the two nodes connected by the edge. At step 703, the file sorting component 553 may sort the files represented by the graph based on the size of the files. In one embodiment, the files may be sorted in a decreasing order of the file size.

At step 704, the graph partitioning component 552 divides the graph into sub-graphs where each sub-graph corresponds to a densely connected groups of nodes. The partitioning may be based on the degree of connectivity of each node and the size of the files associated with the nodes. The degree of connectivity of a node is the number of adjacent nodes that the node is connected to. The graph partitioning component 552 may compare the total size of the files and common file chunks associated with a partition to the maximum capacity of a type of storage tape, at step 705. If the total size of the files and file chunks is more than the capacity the tape, then the graph partitioning component 552 may further divide this partition into smaller partitions using the same process, until the files and common file chunks of each partition can fit in a tape, per step 706.

Once the partitioning of the graph 600 has been completed, the data storage component 554 forwards the files and common file chunks associated with each partition to the data storage management software 445, at step 707. The data storage management software 445 completes the data archiving by storing the files and common file chunks for each partition in a tape 446, at step 708.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. For example, audio, text, spreadsheets, and databases could be encapsulated with metadata. Such audio may include information on heart murmurs. Text could include patient medical records and financial. Spreadsheets and databases may include company or hospital-wide activities. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "component" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    representing a file system as a graph wherein each node in the graph represents a file and each edge in the graph represents file chunks common to the files associated with the nodes connected by each said edge;
    partitioning the graph into disjoint sub-graphs;
    if the files and common file chunks respectively represented by the nodes and edges in a first sub-graph fit into a first data storage medium, storing said files and common file chunks in the first data storage medium;
    if the files and common file chunks respectively represented by the nodes and edges in the first sub-graph do not fit into the first data storage medium, repeatedly partitioning the first sub-graph into disjoint second sub-graphs wherein adjacent nodes in the first sub-graph that have degrees of connectivity above a particular value are in one of the second sub-graphs, wherein degree of connectivity is based on a measure of connectivity among nodes; and
    storing the files and common file chunks respectively represented by the nodes and edges in said one of the second sub-graphs in a second data storage medium.

2. The method of claim 1, wherein the graph and sub-graphs are partitioned using a search process selected from the group consisting of a breadth-first search and a depth-first search.

3. The method of claim 1, further comprising sorting the sub-graphs in terms of the size of the files corresponding to the nodes in each sub-graph without the common file chunks associated with the edges in said each sub-graph, and storing file data associated with the largest sub-graph first.

4. The method of claim 1, wherein the common file chunks are indirectly shared by the files associated with the nodes connected by said edge through another file.

5. The method of claim 4, wherein only one copy of the indirectly shared common file chunks is stored in the first and second data storage media.

6. The method of claim 1, wherein adjacent nodes in the first sub-graph that have degrees of connectivity less than a threshold are arbitrarily partitioned into the disjoint second sub-graphs for minimizing a number of files that share common file chunks for storage on different data storage media.

7. The method of claim 1, wherein the degree of connectivity of a node comprises a number of edges originating from the node times a weight of the originating edges.

8. The method of claim 1, wherein the degree of connectivity of a node comprises one of a total size of common file chunks associated with weights of edges originating from the node or a total number of common file chunks associated with weights of edges originating from the node.

9. A computer program product comprising a computer readable non-transitory storage medium having computer readable program code embodied therewith, the computer readable program code comprising:
   computer readable program code configured to represent a file system as a graph wherein each node in the graph represents a file and each edge in the graph represents file chunks common to the files associated with the nodes connected by said edge;
   computer readable program code configured to partition the graph into disjoint sub-graphs;
   if the files and common file chunks respectively represented by the nodes and edges in a first sub-graph fit into a first data storage medium, computer readable program code configured to store said files and common file chunks in said first data storage medium;
   otherwise, computer readable program code configured to repeatedly partition the first sub-graph into disjoint second sub-graphs wherein adjacent nodes in the first sub-graph that have degrees of connectivity above a particular value are in one of the second sub-graphs, wherein degree of connectivity is based on a measure of connectivity among nodes; and
   computer readable program code configured to store the files and common file chunks respectively represented by the nodes and edges in said one the second sub-graphs in a second data storage medium.

10. The computer program product of claim 9, wherein the graph and sub-graphs are partitioned using a search process selected from the group consisting of a breadth-first search and a depth-first search.

11. The computer program product of claim 9, further comprising computer readable program code configured to sort the sub-graphs in terms of the size of the files corresponding to the nodes in each sub-graph without the common file chunks associated with the edges in said each sub-graph, and to store file data associated with the largest sub-graph first.

12. The computer program product of claim 9, wherein the common file chunks are indirectly shared by the two files associated with the nodes connected by said edge through another file.

13. The computer program product of claim 12, wherein only one copy of the indirectly shared common file chunks is stored in the first and second data storage media.

14. The computer program product of claim 9, wherein adjacent nodes in the first sub-graph that have degrees of connectivity less than a threshold are arbitrarily partitioned into the disjoint second sub-graphs for minimizing a number of files that share common file chunks for storage on different data storage media.

15. A system comprising:
   a data storage system;
   a processor; and
   a data archiving client operable with the processor comprising:
      a data representation component for representing a file system as a graph wherein each node in the graph represents a file and each edge in the graph represents file chunks common to the files associated with the nodes connected by said edge;
      a graph partitioning component for partitioning the graph into disjoint sub-graphs;
      if the files and common file chunks respectively represented by the nodes and edges in a first sub-graph fit into a first data storage medium accessible by the data storage system, a data storing component for storing said files and common file chunks in the first data storage medium;
      if the files and common file chunks respectively represented by the nodes and edges in the first sub-graph do not fit into the first data storage medium, the graph partitioning component repeatedly partitioning the first sub-graph into disjoint second sub-graphs wherein adjacent nodes in the first sub-graph that have degrees of connectivity above a particular value are in one of the second sub-graphs, wherein degree of connectivity is based on a measure of connectivity among nodes; and
      a data storing component for storing the files and common file chunks respectively represented by the nodes and edges in said one of the second sub-graphs in a second data storage medium accessible by the data storage system.

16. The system of claim 15, wherein the graph and sub-graphs are partitioned using a search process selected from the group consisting of a breadth-first search and a depth-first search process.

17. The system of claim 15, further comprising a data sorting component for sorting the sub-graphs in terms of the size of the files corresponding to the nodes in each sub-graph without the common file chunks associated with the edges in said each sub-graph, and wherein the data storing component stores file data associated with the largest sub-graph first.

18. The system of claim 15, wherein the common file chunks are indirectly shared by the files associated with the nodes connected by said edge through another file.

19. The system of claim 18, wherein only one copy of the indirectly shared common file chunks is stored in the first and second data storage media.

20. The system of claim 15, wherein adjacent nodes in the first sub-graph that have degrees of connectivity less than a threshold are arbitrarily partitioned into the disjoint second sub-graphs for minimizing a number of files that share common file chunks for storage on different data storage media.

* * * * *